(12) United States Patent
Ferris et al.

(10) Patent No.: US 8,954,564 B2
(45) Date of Patent: Feb. 10, 2015

(54) CROSS-CLOUD VENDOR MAPPING SERVICE IN CLOUD MARKETPLACE

(75) Inventors: James Michael Ferris, Cary, NC (US); Gerry Edward Riveros, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 419 days.

(21) Appl. No.: 12/790,229

(22) Filed: May 28, 2010

(65) Prior Publication Data

US 2011/0295998 A1    Dec. 1, 2011

(51) Int. Cl.
G06F 15/173    (2006.01)
G06F 9/50    (2006.01)
G06Q 30/08    (2012.01)

(52) U.S. Cl.
CPC .............. G06F 9/5072 (2013.01); G06Q 30/08 (2013.01)
USPC ............................ 709/224; 709/223; 709/225

(58) Field of Classification Search
None
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,086,625 B2 * | 12/2011 | Lim et al. ...................... | 707/769 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Ninos Donabed
(74) *Attorney, Agent, or Firm* — Lowenstein Sandler LLP

(57) ABSTRACT

Embodiments relate to systems and methods for a cross-cloud vendor mapping service in a dynamic cloud marketplace. The cloud marketplace system receives bids from a user for the provisioning of applications or other software in the cloud, and registers selected provisioning clouds to deliver the requested software. The set of provisioning clouds can be re-selected on a scheduled and/or other ongoing basis, creating a sequence of provisioning clouds. A vendor mapping service can be abstracted and provided external to the cloud marketplace system, and track the user's software usage across the shifting sets of provisioning clouds. The vendor mapping service can aggregate the usage history over time, and generate billing and/or other subscription reports. The cloud marketplace system need only register the user ID, software applications, and/or other subscription data to the vendor mapping service one time, after which the service can track the user's software usage history automatically.

20 Claims, 7 Drawing Sheets

(56) References Cited

U.S. PATENT DOCUMENTS

| | | |
|---|---|---|
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1* | 4/2008 | Meijer et al. ............... 726/9 |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0177698 A1* | 7/2009 | Chan et al. ............... 707/104.1 |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0030743 A1* | 2/2010 | Lim et al. ............... 707/3 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0069797 A1* | 3/2010 | Cain et al. ............... 601/2 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1* | 1/2011 | Jackson ............... 709/226 |
| 2011/0029873 A1* | 2/2011 | Eseanu et al. ............... 715/719 |
| 2011/0055399 A1* | 3/2011 | Tung et al. ............... 709/226 |
| 2011/0131335 A1 | 6/2011 | Spaltro et al. |
| 2011/0137947 A1* | 6/2011 | Dawson et al. ............... 707/785 |
| 2011/0138050 A1* | 6/2011 | Dawson et al. ............... 709/226 |
| 2011/0145392 A1* | 6/2011 | Dawson et al. ............... 709/224 |
| 2011/0145439 A1* | 6/2011 | Chaturvedi et al. ............ 709/244 |
| 2011/0166952 A1* | 7/2011 | Manchikanti et al. ....... 705/26.4 |
| 2011/0200325 A1* | 8/2011 | Kobyakov et al. ............... 398/25 |
| 2011/0251937 A1* | 10/2011 | Falk et al. ............... 705/34 |
| 2012/0010541 A1* | 1/2012 | Cain et al. ............... 601/2 |
| 2012/0315858 A1* | 12/2012 | Kobyakov et al. ............ 455/67.11 |
| 2013/0297800 A1* | 11/2013 | Considine et al. ............ 709/226 |
| 2014/0081932 A1* | 3/2014 | Krislov ............... 707/694 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating. Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Base on Workload Conditions", U.S. Appl. No. 13/117,937, filed May 27, 2011.

Morgan, "Systems and Methods for Tracking Cloud installation Information Using Cloud-Aware Kernel of Operating System", U.S. Appl. No. 13/149,750, filed May 31, 2011.

(56) References Cited

OTHER PUBLICATIONS

Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 25, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Cloud Vendor Mapping Service in Cloud Networks", U.S. Appl. No. 12/790,162, filed May 28, 2010.
Ferris et al., "Systems and Methods for Aggregate Monitoring of Utilization Data for Vendor Products in Cloud Networks", U.S. Appl. No. 12/790,039, filed May 28, 2010.

* cited by examiner

FIG. 5

USAGE AGGREGATION TABLE 158

| USER | APPLICATION | PROVISIONING CLOUD | DURATION | IMAGES | ... | FIELD Q |
|---|---|---|---|---|---|---|
| USER 1 | APPLICATION A | CLOUD 2 | 10:45 | 1 | | |
| USER 1 | APPLICATION A | CLOUD 6 | 6:10 | 2 | | |
| USER 1 | APPLICATION A | CLOUD 17 | 24:50 | 1 | | |
| USER 2 | APPLICATION B | CLOUD 103 | 60:55 | 1 | | |
| USER 2 | APPLICATION B | CLOUD 64 | 20:05 | 1 | | |
| | | | ... | ... | | ... |
| USER N | APPLICATION Z | CLOUD M | DURATION P | 13 | | |

160 SET OF USAGE ATTRIBUTES

150

CROSS-CLOUD USAGE DATABASE

CROSS-CLOUD VENDOR MAPPING SERVICE IN CLOUD MARKETPLACE

FIELD

The invention relates generally to systems and methods for a cross-cloud vendor mapping service in a dynamic cloud marketplace, and more particularly, to platforms and techniques for registering, tracking, and reporting a user's software usage history across a dynamically shifting sequence of provisioning clouds selected from a set of marketplace clouds mediated by a cloud marketplace system.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In addition, cloud platforms exist or are envisioned today in which the user's desired virtual machines and software are received from a cloud marketplace system. In a cloud marketplace system, the user can transmit a software request to a cloud marketplace system, which acts as an intermediary between the user and a set of marketplace clouds. The marketplace clouds can receive the user's software request (or request for other resources), and submit a bid to the cloud marketplace system to supply or fulfill the software specified by the user. The cloud marketplace system can be configured to select the fulfillment bid from the marketplace clouds that satisfies the user's software request at lowest cost, and/or based on other decision logic.

In cloud marketplace systems, the set of clouds which deliver or provision the user's requested software or other resources can change over time, due to various reasons. For one, the marketplace clouds themselves may alter or withdraw the applications or other software which they are offering to users of the marketplace. For another, the user may wish to update their requested software or change any selection criteria they wish to apply to fulfillment bids received from clouds in the marketplace. As such, the set of provisioning clouds that are actually delivering or supporting the user's software deployment and/or other resources can shift or change over time, as existing clouds drop out and/or new clouds are substituted. The user can thus be supported by a sequence or progression of different clouds selected from the cloud marketplace, over time.

In the face of a potentially ever-shifting sequence of provisioning clouds, it may be a practical difficulty or inconvenience for the cloud marketplace system and/or user to be presented with a series of new clouds with which to register, and from which to extract usage and subscription data for billing or other purposes. It may be desirable to provide systems and methods for cross-cloud vendor mapping service in a dynamic cloud marketplace, in which the task of registering, storing, and aggregating the user's software usage history can be performed by an external mapping service configured to capture that history across a series of different provisioning clouds at different times, and aggregate billing and subscription data across different software, vendors, users, and clouds.

DESCRIPTION OF DRAWINGS

FIG. 5 illustrates an exemplary hardware configuration for a cloud management system that can support and maintain one or more cloud-based networks, according to various embodiments;

DESCRIPTION

Figure 1:
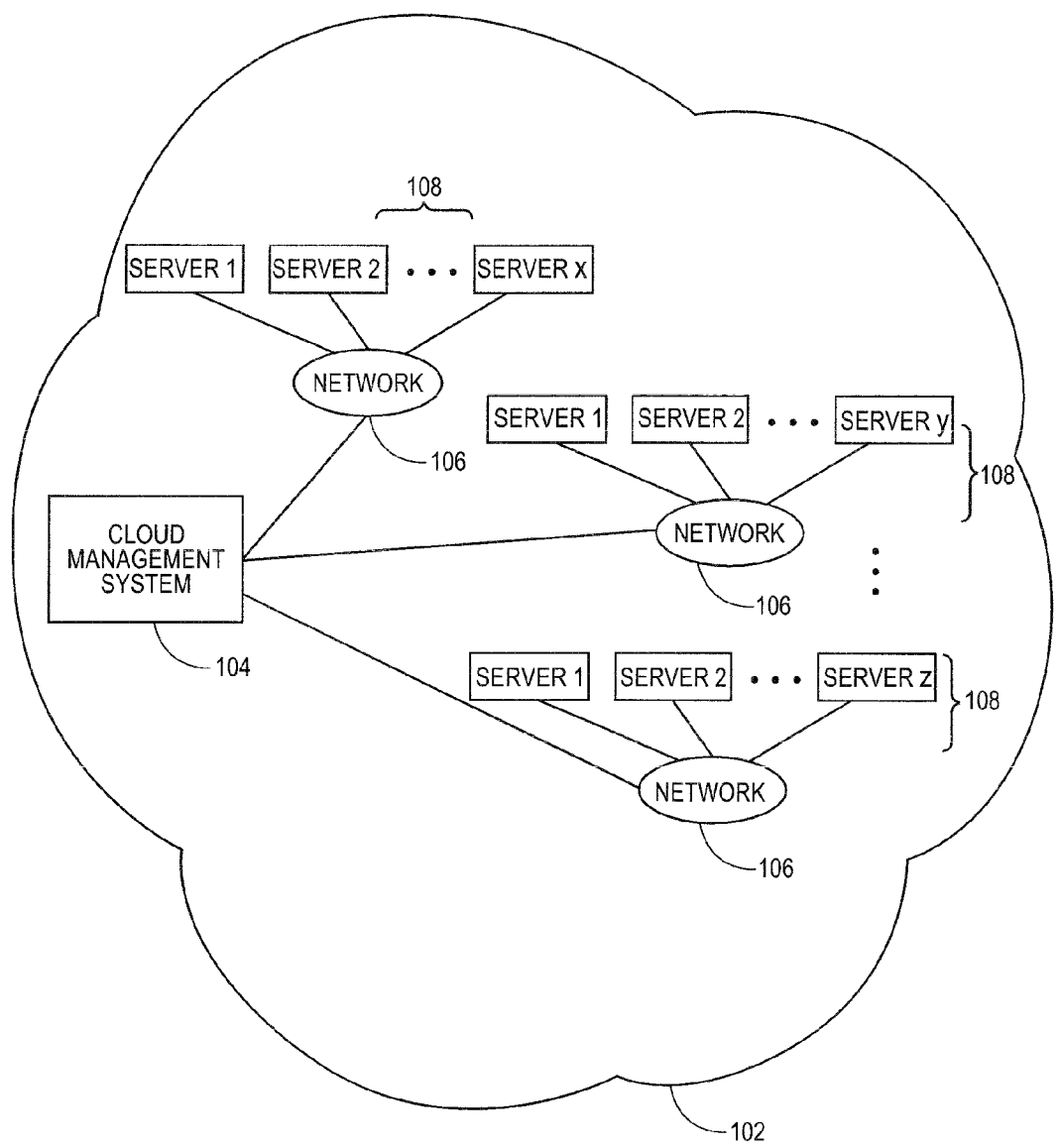
FIG. 1 illustrates an overall cloud system architecture in which various aspects of systems and methods for a cross-cloud vendor mapping service in a dynamic cloud marketplace can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
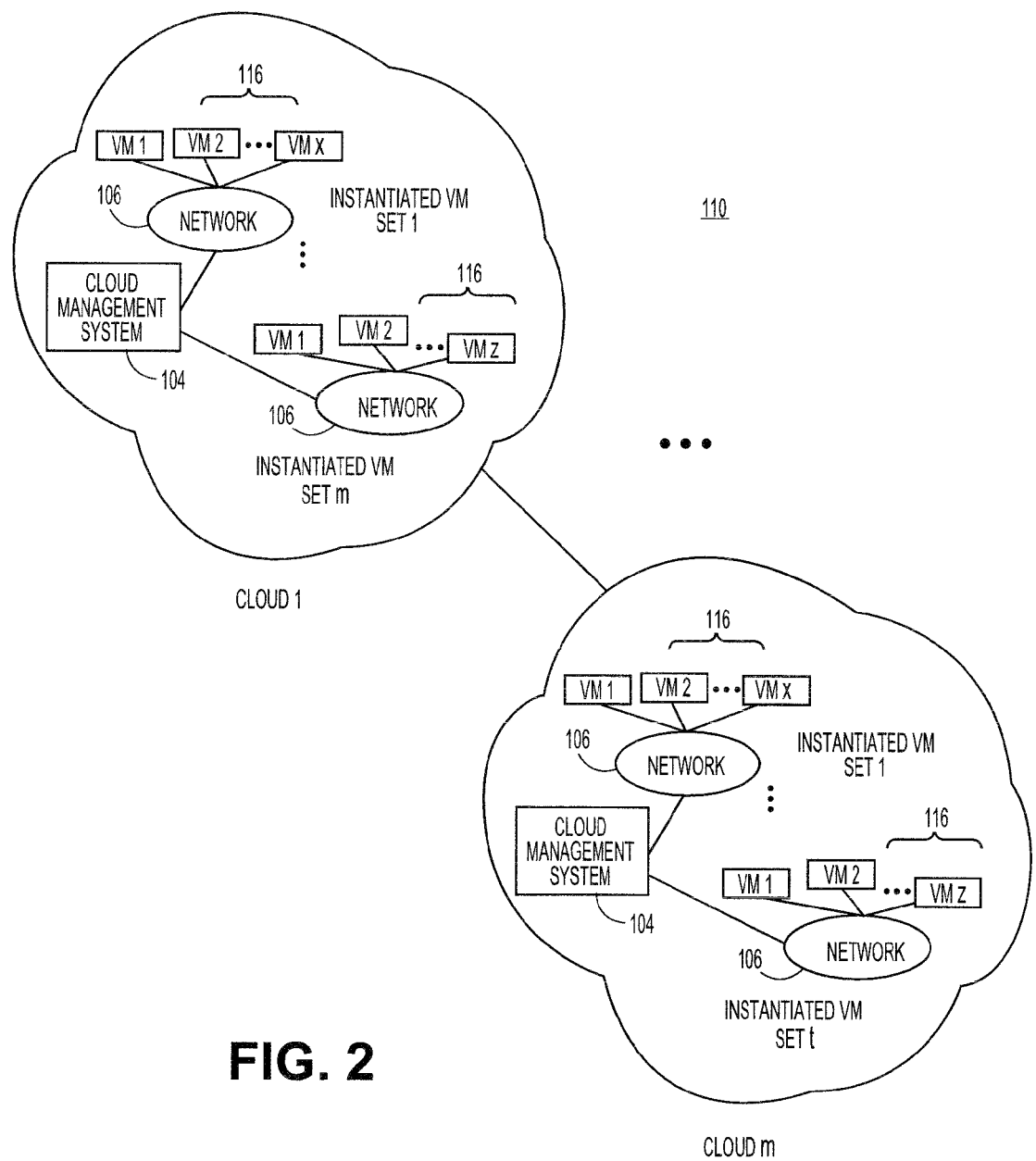
FIG. 2 illustrates an overall cloud system architecture in which various aspects of systems and methods for a cross-cloud vendor mapping service in a dynamic cloud marketplace can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
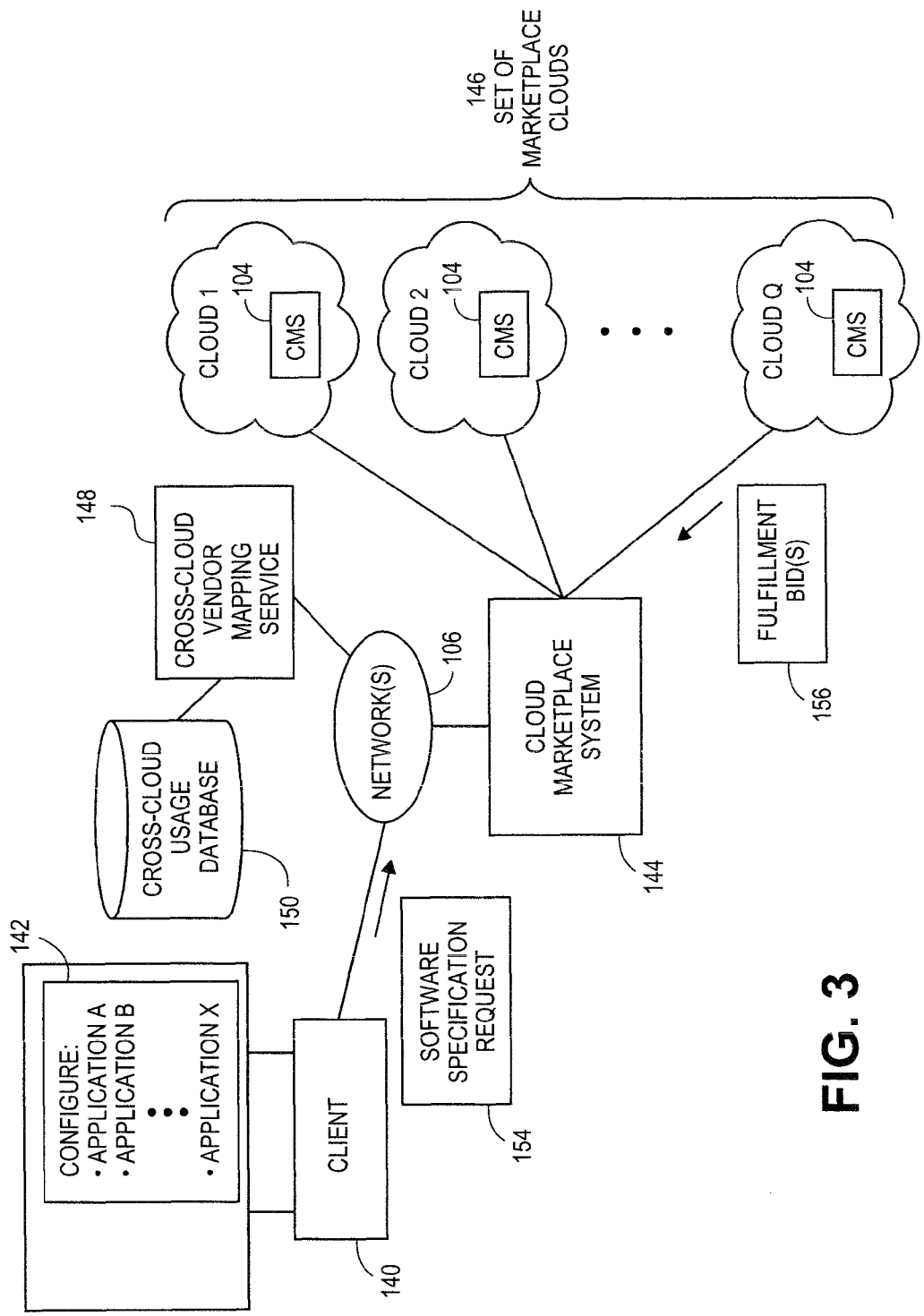
FIG. 3 illustrates a network configuration in which a cross-cloud mapping service, cloud marketplace system, and other resources can interact with a set of cloud marketplace clouds, cross-cloud vendor mapping service, and other resources, to perform various cloud usage history tracking functions across shifting cloud sets in a set of marketplace clouds, according to various embodiments.

FIG. 3 illustrates an illustrative network configuration in which systems and methods for a cross-cloud vendor mapping service in a dynamic cloud marketplace can be implemented, according to various embodiments. In embodiments as shown, a user can operate a client 140 to generate a software specification request 154 using an application selector 142. In aspects, the user can select one or more applications, appliances, operating systems, components thereof, and/or other software to request to be installed and run on the client 140, and specify that selected software in the software specification request 154. In aspects, the client 140 can be a virtual machine, and can for instance be maintained or instantiated in a cloud-based network. In aspects, the user can transmit the software specification request 154 to a cloud marketplace system 144 via one or more networks 106, to request that the cloud marketplace system 144 receive, decode, and fulfill the software specification request 154 by interacting with a set of marketplace clouds 146.

In general, the set of marketplace clouds 146 can comprise a set of cloud-based networks configured to communicate with the cloud marketplace system 144, and respond to requests for software and/or other resources, such as the software specification request 154. In aspects, one or more of the clouds in the set of marketplace clouds 146 can respond to the software specification request 154 when notified by the cloud marketplace system 144 by generating a set of fulfillment bids 156, and transmitting the set of fulfillment bids 156 to the cloud marketplace system 144. In aspects, the set of fulfillment bids 156 can be or include an indication of the availability of an application and/or other software resource, the version of that software, the number of instances of that software that the offering cloud can deliver, a timer period over which the software can be made available, a subscription cost and/or other cost for the delivery and use of the software, and/or other information. In aspects, the cloud marketplace system 144 can receive the set of fulfillment bids 156 from one or more cloud-based networks in the set of marketplace clouds 146, and can receive and store all such responses from the set of marketplace clouds 146. In aspects, the cloud marketplace system 144 can be configured with decision logic to selected one or more clouds in the set of marketplace clouds 146 to deliver and install software satisfying the software specification request 154, such as, for instance, logic which selects the set of fulfillment bids 156 promising to deliver at least the minimum application requirements that may be specified in the software specification request 154, and at the lowest subscription cost. Other decision criteria can be used by the cloud marketplace system 144, and in embodiments, the cloud marketplace system 144 can query the user of client 140 to receive a selection of the set of fulfillment bids 156, if more than one bid or offer is received or selected.

After selection of the set of fulfillment bids 156 satisfying the software specification request 154 and otherwise identified for selection, the cloud marketplace system 144 can register that set of cloud-based networks chosen to provision the requested software. In accordance with the present teachings, the cloud marketplace system 144 can also register the selected cloud-based networks in the set of marketplace clouds 146 chosen to provision the requested software to the cross-cloud vendor mapping service 148. In aspects, the cross-cloud mapping service 148 can establish, build, and maintain a cross-cloud usage database 150 that can access, extract, and/or record the usage history data for the software delivered from the one or more clouds of the set of marketplace clouds 146 chosen to provision the user's requested software. The cross-cloud usage database 150 can record the application and/or other software name or other ID, version, usage times, usage durations, and/or other information related to the user's use of the selected software, once that software has been provisioned by the set of marketplace clouds 146. In aspects, it may be noted that the cloud-based networks in the set of marketplace clouds 146 selected to deliver the user's selected software can change over time. The dynamic nature of the particular cloud-based network(s) used to provision the user's selected software can be due to a variety of factors, including, for instance, the delivery of updated versions of the set of fulfillment bids 156 from the set of marketplace clouds 146. When the set of fulfillment bids 156 is updated, different cloud-based networks in the set of marketplace clouds 146 may offer or bid to deliver the selected software and/or related resources under different or updated terms, leading to a reselection of the cloud-based networks in the set of marketplace clouds 146 to be used to provision the client 140 and/or other machines. In aspects, the cross-cloud mapping service 148 can automatically continue to track the usage of the user's selected software in the set of marketplace clouds 146, across the dynamic progression of different provisioning clouds in the set of marketplace clouds 146 without a need to reset or re-register the user, the client 140, the cloud marketplace system 144, and/or other parameters related to the tracking of the user's software consumption.

Figure 4:
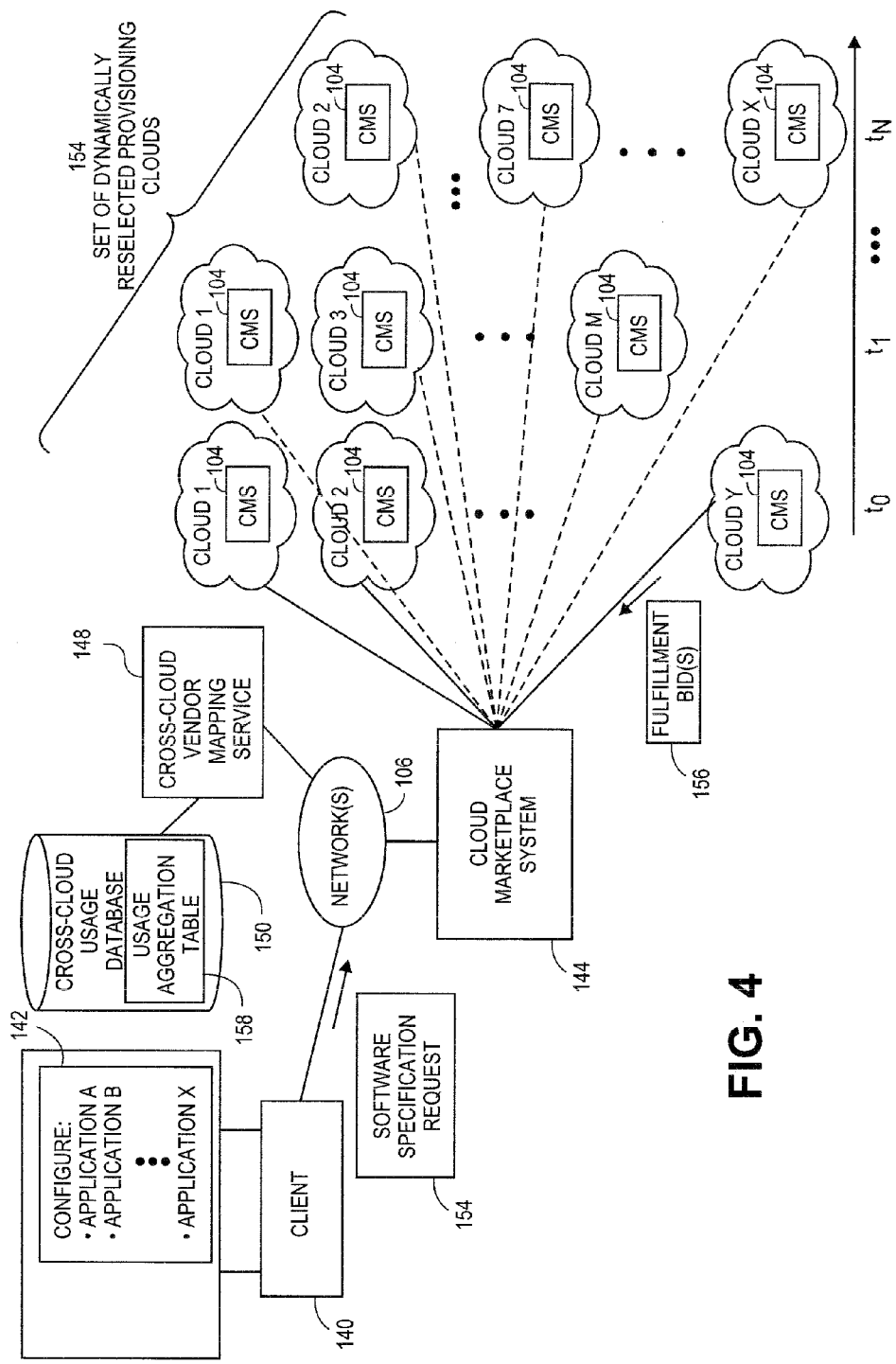
FIG. 4 illustrates a network configuration in which a cross-cloud mapping service, cloud marketplace system, and other resources can interact with a set of cloud marketplace clouds, cross-cloud vendor mapping service, and other resources, to perform various cloud usage history tracking functions across shifting cloud sets in a set of marketplace clouds, according to various embodiments in further regards.

More particularly, and as shown for example in FIG. 4, over time the marketplace engine 152 may be presented with an updated or reconfigured set of fulfillment bids 156 from the constituent clouds of the set of marketplace clouds 146. The set of fulfillment bids 156 can be updated, for example, due to the expiration of a previous provisioning commitment by one or more of the set of dynamically re-selected provisioning clouds 154, by a change in the available software complement of the set of fulfillment bids 156, by a changed or updated software specification request 154 transmitted by the user of the client 140, and/or due to other reasons or factors. The receipt of an updated software specification request 154 and/or updated set of fulfillment bids 156 can lead to the cloud marketplace system 144 generating a new set of selections from the set of marketplace clouds 146. In aspects, the process of re-selecting a set of cloud-based networks from the set of marketplace clouds 146 can generate or produce a set of dynamically re-selected provisioning clouds 154, individual components or subsets of which can reflect the cloud-based network or networks selected over given intervals of time, to provision the user's selected software specified by the software specification request 154. In aspects, the software specification request 154 can be re-selected or re-configured at regular and/or irregular intervals of time, and/or combinations of the same. In aspects, the process of substituting or updating the software specification request 154 from the marketplace engine 152 can be conducted on a transparent basis, without notification or display of the changes in underlying cloud support to the user. In aspects, the user of the client 140 can continue to use the one or more applications and/or other software they have selected, without interruption.

In aspects as shown, as the software specification request 154 are dynamically updated or reconfigured, the cross-cloud mapping service 148 can register, track, and compile the usage history of the user's selected software in the cross-cloud usage database 150. That is, in aspects, the cross-cloud mapping service 148 can register with each successive cloud set in software specification request 154, identify the user, the user's application(s), and/or other data, and extract and store the usage history from those cloud sets, for instance in a usage aggregation table 158 and/or other data structure or data store. In aspects, the resulting usage aggregation table 158 can thereby build, in one storage location, the usage history for the user's selected software across all of the software specification request 154 at different times, and capturing that history for any one or more applications and/or other software the user may select and receive from the set of marketplace clouds 146. It may be noted that in aspects, different clouds in the software specification request 154 may appear more than once at different times and/or over different intervals, as successive or updated bids from those cloud-based networks are received, and those clouds are selected or de-selected. Because in one regard the processing needed to track, capture, storage and aggregate the usage aggregation table 158 and/or other information is abstracted to the cross-cloud mapping service 148, it may be noted that the cloud marketplace system 144 need not maintain or store that type of data independently in storage association with that system. The cloud marketplace system 144 can thereby act as a generator of one or more sets of marketplace clouds 146, and generate multiple sets of marketplaces without a need to register and track usage history data for individual users each time a set of dynamically re-selected provisioning clouds 154 in a set of marketplace clouds 146 is formed, and/or arrange, configure, or test that service for each marketplace that is built. In addition, the cross-cloud mapping service 148 can be configured to track the software usage for a user, application, and/or vendor in the set of marketplace clouds 146 over an extended or indefinite period of time, whether that usage is on a continuous, near-continuous, and/or intermittent basis, as the set of fulfillment bids 156 is received, and/or other conditions change.

FIG. 5 illustrates an exemplary data structure in which the usage aggregation table 158 and/or other associated information can be encoded and stored in the cross-cloud usage database 150 or other data store, according to various aspects. In aspects as shown, the usage aggregation table 158 can include and be organized using a set of usage attributes 160, for instance, organized as keys or columns recording various attributes of the usage history by a given user and their installed software in the set of marketplace clouds 146. In aspects, the usage aggregation table 158 can be recorded in a flat and/or relational database, as shown. When encoded as a relational database, the usage aggregation table 158 can be organized or ordered around, for instance, a user ID field as a key field or first column in the set of usage attributes 160. When stored in a relational format with a key field or first column reflecting a user ID, the usage aggregation table 158 can be further sorted based within user IDs to generate an order based on, for example, a given user's installed applications, host cloud identification, and other fields, as shown. The captured usage data for a given user can in addition or instead be organized or sorted on other attributes in the set of usage attributes 160, such as, for instance, based on elapsed usage time or duration, number of application images or other instances, applicable operating system, end-user identities or groups of identities, and/or based on other single or joint attributes, criteria, or filters. In aspects, the cross-cloud usage database 150, the usage aggregation table 158, and/or other data objects or structures can be, include, or access a SQL (structured query language) database engine. In aspects, the software specification request 154, the set of fulfillment bids 156, and/or other data or commands can be generated using queries received or executed in the SQL (structured query language) protocol, or others, such as the extensible markup language (XML) protocol. Other types, configurations, and formats of data can be used in the cross-cloud usage database 150, the usage aggregation table 158, and/or other associated information.

Figure 6:
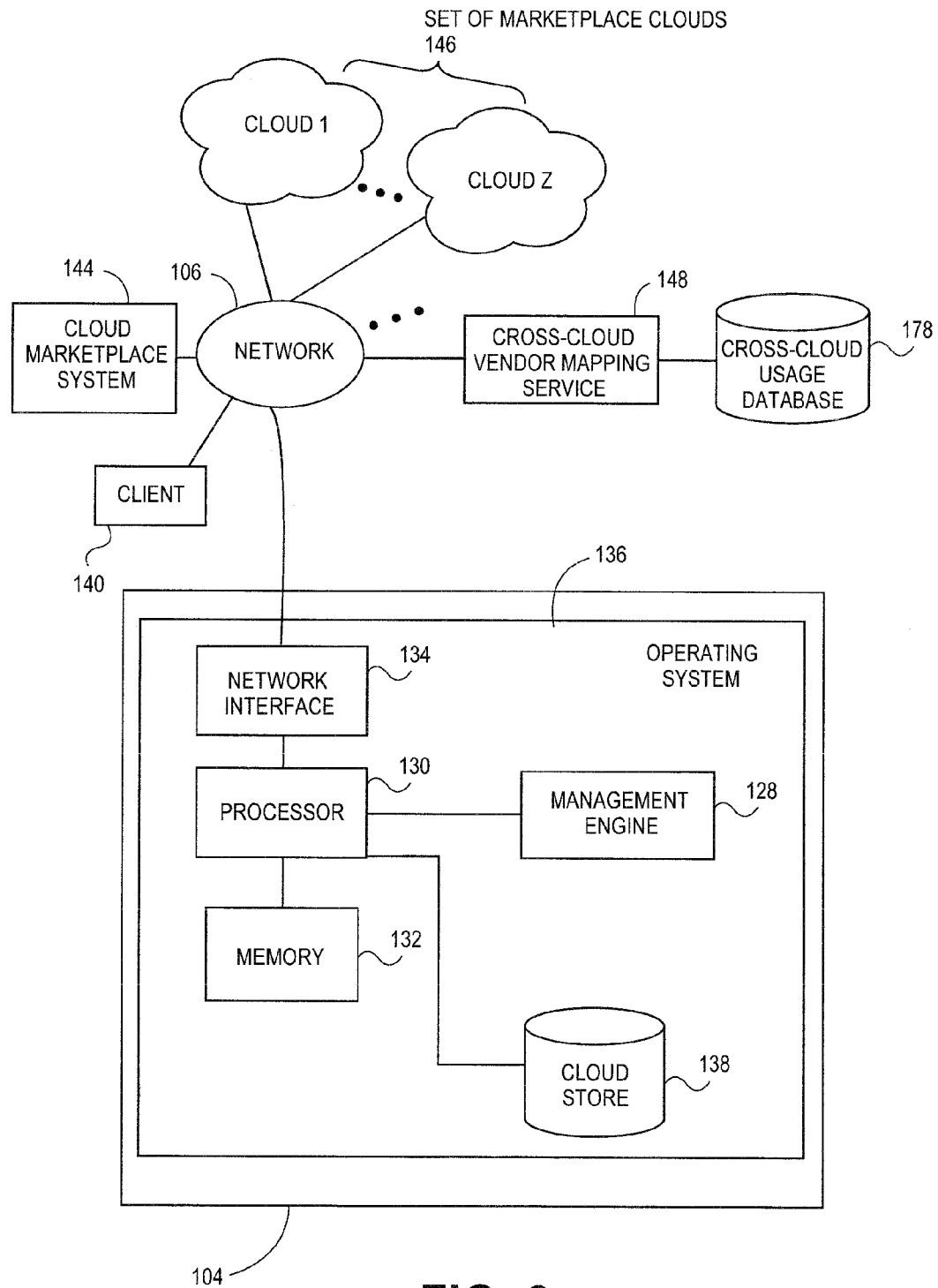
FIG. 6 illustrates an exemplary data structure in a mapping database that can store usage-related information for users operating software applications and or using other cloud resources, according to various embodiments.

FIG. 6 illustrates an exemplary diagram of hardware and other resources that can be incorporated in a cloud management system 104 configured to communicate with the set of instantiated virtual machines 116, the cloud marketplace system 144, set of marketplace clouds 146, the cross-cloud mapping service 148, the cross-cloud usage database 150, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of marketplace clouds 146, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the cross-cloud mapping service 148 via one or more networks 106, as well as the cross-cloud usage database 150, and/or other network resources in any one or more cloud in the set of marketplace clouds 146. Other configurations of the cloud management system 104, associated network connections, and other hardware, software, and service resources are possible. It may be noted that in embodiments, the marketplace engine 152, the client 140, and/or other hardware machines, platforms, or engines can comprise the same or similar resources as cloud management system 104, or can be configured with different hardware and software resources.

Figure 7:
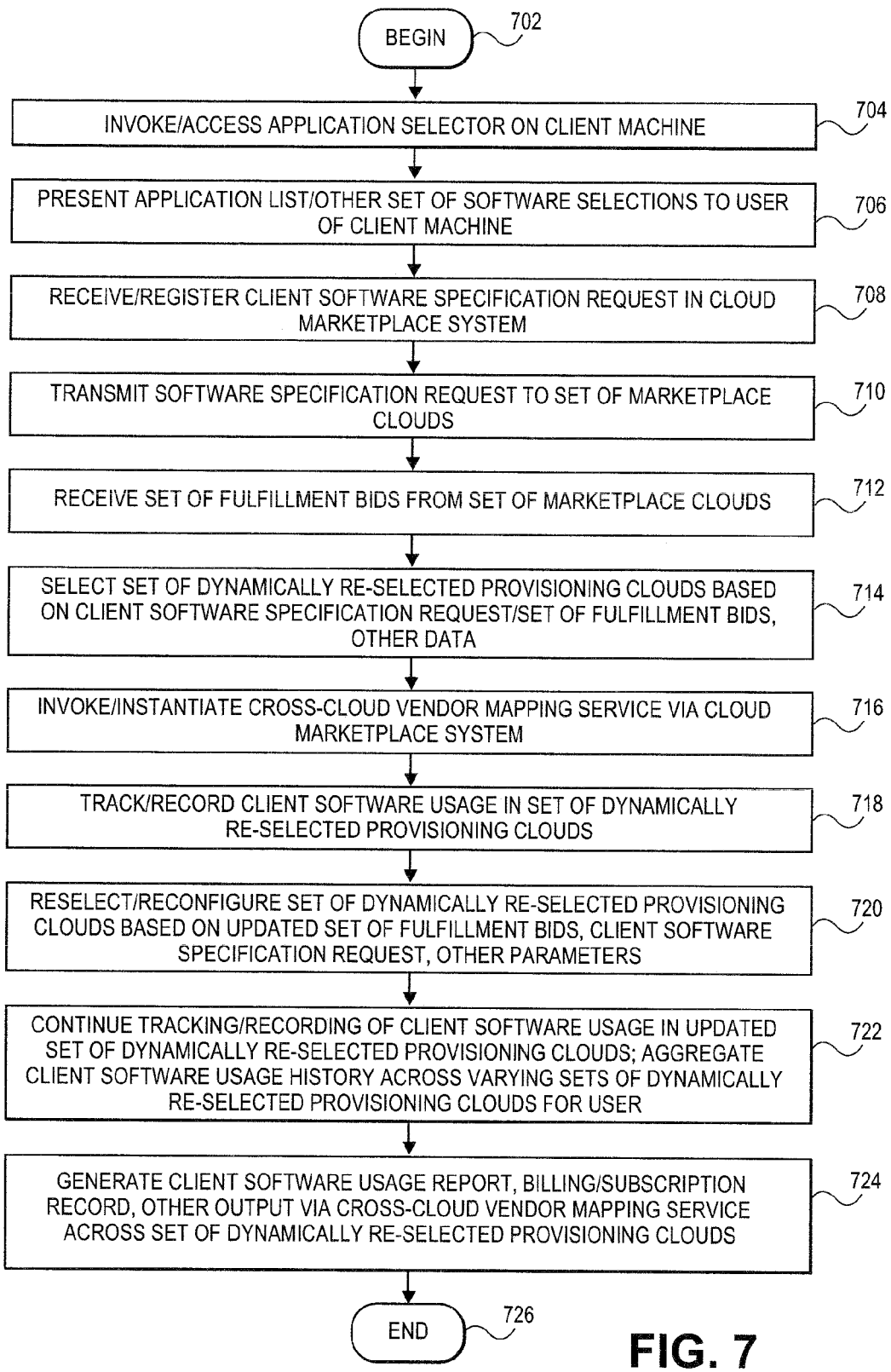
FIG. 7 illustrates a flowchart for processing the capture, management and aggregation of software usage history data across dynamically reselected provisioning clouds in a set of marketplace clouds, according to various embodiments.

FIG. 7 illustrates a flowchart of overall processing to generate and manage services for the monitoring and aggregation of software utilization data in a series of dynamically shifting sets of provisioning clouds in a cloud marketplace environment, according to various embodiments of the present teachings. In 702, processing can begin. In 704, a user of the client 140 can invoke and/or instantiate an application selector 142 on the client 140. In 706, the application selector 142 can present the user with a list of applications and/or other software available via the cloud marketplace system 144 and/or other sources. In 708, the resulting software specification request 154 incorporating the user's selections from the application selector 142 can be received and registered in the cloud marketplace system 144. In aspects, the software specification request 154 can be transmitted from the client 140 to the cloud marketplace system 144 in a secure or encoded format. In 710, the software specification request 154 can be transmitted to the set of marketplace clouds 146, for receipt, decoding, and evaluation by those clouds for potential response. In aspects, the cloud-based networks in the set of marketplace clouds 146 can be related, affiliated, and/or independent of each other and/or the cloud marketplace system 144.

In 712, the cloud marketplace system 144 can receive the set of fulfillment bids 156 from those cloud-based networks in the set of marketplace clouds 146 wishing to respond to the software specification request 154. In 714, the cloud marketplace system 144 can select an initial set of provisioning clouds in the software specification request 154, based on the software specification request 154, the set of fulfillment bids 156, and/or other data. In 716, the cross-cloud mapping service 148 can be invoked and/or instantiated via the cloud marketplace system 144. In 718, the cross-cloud mapping service 148 can track, register, store, and/or record the user's software usage in the software specification request 154 to the usage aggregation table 158 of the cross-cloud usage database 150, and/or to other local or remote data stores. In 720, the cloud marketplace system 144 can re-select, re-configure, and/or otherwise update or adjust the software specification request 154 based on an updated set of fulfillment bids 156, an updated software specification request 154, and/or other parameters. In 722, the cross-cloud mapping service 148 can continue the tracking and/or recording of the client's software usage in the software specification request 154, and can aggregate the client software usage history across varying sets of provisioning clouds in the software specification request 154 for the user. In 724, the cross-cloud mapping service 148 can generate a client software usage history report, a billing and/or subscription record, and/or other output for the user based on the data in the usage aggregation table 158 and/or other sources, that data being aggregated across the software specification request 154. In 726, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, set of virtual machines 178, and/or other machines, entities, services, or resources. For further example, while embodiments have been described in which one cross-cloud vendor mapping service operates to access, track, and manage the usage history including the profile of a user's consumption of software and hardware resources in the host cloud 166, in embodiments, multiple usage exporting services can operate and cooperate to maintain and transfer usage data on a cross-cloud, cross-vendor, or other basis. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
receiving, by a processor, a request to provision a first computing resource, the request comprising an operational specification of the first computing resource;
selecting a first provisioning cloud from a plurality of marketplace clouds in view of the operational specification and provisioning bids received from the plurality of marketplace clouds;
receiving an updated operational specification of the first computing resource;
receiving updated provisioning bids responsive to the updated operational specification;
selecting a second provisioning cloud from the plurality of marketplace clouds in view of the updated provisioning bids;
providing an interface between the first computing resource and a second computing resource residing in the second provisioning cloud; and
tracking resource usage data of the first computing resource across the first provisioning cloud and the second provisioning cloud, wherein usage of the first computing resource in the second provisioning cloud is initiated after termination of usage of the first computing resource in the first provisioning cloud.

2. The method of claim 1, wherein the first computing resource comprises at least one of a software appliance, a software application, or an operating system.

3. The method of claim 1, wherein the request further comprises at least one of a subscription cost, a minimum number of software images to be deployed, a maximum number of software images to be deployed, a software version specification, or a software support specification.

4. The method of claim 1, wherein the tracking comprises communicating with a cloud management system.

5. The method of claim 1, wherein the tracking comprises extracting the resource usage data from the two or more provisioning clouds via a cloud management system.

6. The method of claim 1, wherein the tracking comprises storing the resource usage data to a marketplace usage database.

7. The method of claim 1, further comprising selecting an additional provisioning cloud from the plurality of marketplace clouds in view of the updated operational specification.

8. The method of claim 1, further comprising generating at least one of a billing or subscription record in view of the resource usage data.

9. The method of claim 1, further comprising aggregating resource usage data of the first computing resource across the first provisioning cloud and the second provisioning cloud.

10. The method of claim 1, wherein the request to provision the first computing resource comprises a request to instantiate one or more virtual machines.

11. A system, comprising:
an interface to a plurality of marketplace clouds; and
a processor, to communicate with the plurality of marketplace clouds via the interface, the processor to:
receive a request to provision a first computing resource, the request comprising an operational specification of the first computing resource;
select a first provisioning cloud from a plurality of marketplace clouds in view of the operational specification and provisioning bids received from the plurality of marketplace clouds;
receive an updated operational specification of the first computing resource;
receive updated provisioning bids responsive to the updated operational specification;
select a second provisioning cloud from the plurality of marketplace clouds in view of the updated provisioning bids;
provide an interface between the first computing resource and a second computing resource residing in the second provisioning cloud; and
track resource usage data of the first computing resource across the first provisioning cloud and the second provisioning cloud, wherein usage of the first computing resource in the second provisioning cloud is initiated after termination of usage of the first computing resource in the first provisioning cloud.

12. The system of claim 11, wherein the first computing resource comprises at least one of a software appliance, a software application, or an operating system.

13. The system of claim 11, wherein the request further comprises at least one of a subscription cost, a minimum number of software images to be deployed, a maximum number of software images to be deployed, a software version specification, or a software support specification.

14. The system of claim 11, wherein the tracking comprises communicating with a cloud management system.

15. The system of claim 11, wherein tracking comprises extracting the resource usage data from the two or more provisioning clouds via a cloud management system.

16. The system of claim 11, wherein the tracking comprises storing the resource usage data to a marketplace usage database.

17. The system of claim 11, wherein the processor is further to select an additional provisioning cloud from the plurality of marketplace clouds in view of the updated operational specification.

18. The system of claim 11, wherein the processor is further to
generate at least one of a billing or subscription record in view of the usage data.

19. The system of claim 11, wherein the processor is further to aggregate resource usage data of the first computing resource across the first provisioning cloud and the second provisioning cloud.

20. The system of claim 11, wherein the request to provision the first computing resource comprises a request to instantiate one or more virtual machines.

\* \* \* \* \*